United States Patent
Schuller et al.

(10) Patent No.: US 10,662,983 B2
(45) Date of Patent: May 26, 2020

(54) ELECTROMAGNET FOR A HYDRAULIC SYSTEM

(71) Applicants: AUDI AG, Ingolstadt (DE); VOLKSWAGEN AKTIENGESELLSCHAFT, Wolfsburg (DE)

(72) Inventors: Dietmar Schuller, Altmannstein (DE); Roland Meyer, Nürtingen (DE); Christian Corell, Oberjossa (DE); Oliver Rang, Kassel (DE)

(73) Assignees: AUDI AG, Ingolstadt (DE); VOLKSWAGEN AKTIENGESELLSCHAFT, Wolfsburg (DE)

(\*) Notice: Subject to any disclaimer, the term of this patent is extended or adjusted under 35 U.S.C. 154(b) by 165 days.

(21) Appl. No.: 15/311,598

(22) PCT Filed: May 8, 2015

(86) PCT No.: PCT/EP2015/000948
§ 371 (c)(1),
(2) Date: Nov. 16, 2016

(87) PCT Pub. No.: WO2015/172875
PCT Pub. Date: Nov. 19, 2015

(65) Prior Publication Data
US 2017/0089370 A1 Mar. 30, 2017

(30) Foreign Application Priority Data
May 16, 2014 (DE) .................... 10 2014 007 130

(51) Int. Cl.
*F15B 21/041* (2019.01)
*F16K 31/06* (2006.01)
(Continued)

(52) U.S. Cl.
CPC .............. *F15B 21/041* (2013.01); *B03C 1/02* (2013.01); *F16H 61/0251* (2013.01);
(Continued)

(58) Field of Classification Search
CPC ... B03C 1/02; B03C 2201/18; B03C 2201/20; B03C 2201/22; B03C 2201/30;
(Continued)

(56) References Cited

U.S. PATENT DOCUMENTS 2,090,035 A * 8/1937 Fellows .................... F23K 5/04
137/115.14
3,880,476 A * 4/1975 Belart ..................... B60T 8/363
137/625.65
(Continued)

FOREIGN PATENT DOCUMENTS

| CN | 101618717 A | 1/2010 |
| DE | 4133536 A1 | 4/1993 |

(Continued)

OTHER PUBLICATIONS

International Search Report dated Jul. 23, 2015 in corresponding Application No. PCT/EP2015/000948; 14 pgs.
(Continued)

*Primary Examiner* — Mary E McManmon
*Assistant Examiner* — Richard K. Durden
(74) *Attorney, Agent, or Firm* — Maier & Maier, PLLC

(57) ABSTRACT

An electromagnet for a hydraulic system, such as an automatic transmission of a motor vehicle. The electromagnet may include an armature chamber filled with hydraulic medium, which may be fluidically connected to hydraulic lines of the hydraulic system, and may have an armature mounted therein. The armature may have an adjustable stroke and may include a shut-off body. The armature may divide the armature chamber into an opening-side chamber
(Continued)

facing the flow opening, and an inner chamber facing away from it. During a stroke movement of the armature, an oil exchange may occur, during which a displacement volume of the hydraulic medium overflows from the opening-side chamber into the inner chamber. The electromagnet may further include a hydraulic medium reservoir, which may store a hydraulic medium having a higher degree of purity than the hydraulic medium in the hydraulic lines and which may be fluidically connected to the opening-side chamber.

6 Claims, 9 Drawing Sheets

(51) Int. Cl.
   *B03C 1/02* (2006.01)
   *F16H 61/02* (2006.01)
   *F16H 61/00* (2006.01)
   *F01L 1/344* (2006.01)

(52) U.S. Cl.
   CPC ...... *F16K 31/0613* (2013.01); *F16K 31/0693* (2013.01); *B03C 2201/22* (2013.01); *B03C 2201/30* (2013.01); *F01L 2001/34436* (2013.01); *F16H 2061/0043* (2013.01); *F16H 2061/0253* (2013.01)

(58) Field of Classification Search
   CPC ..... F01L 2001/34436; F01L 2201/3444; F01L 2001/34443; F15B 21/041; F16H 61/0251; F16H 2061/0253; F16K 31/0613; Y10T 137/3149; Y10T 137/3185; Y10T 137/794; Y10T 137/7976; Y10T 137/8013; Y10T 137/86364; Y10T 137/86372
   USPC ................ 137/215, 216, 544, 545, 546, 591
   See application file for complete search history.

(56) References Cited

U.S. PATENT DOCUMENTS

| | | | | |
|---|---|---|---|---|
| 4,141,533 A * | 2/1979 | Goodman | ............. | F16K 3/0254 251/280 |
| 4,250,922 A * | 2/1981 | Will | ................... | F16K 31/0613 137/116.3 |
| 4,478,250 A * | 10/1984 | Lukasczyk | ......... | G05D 16/2093 137/625.65 |
| 4,563,664 A | 1/1986 | Chin | | |
| 4,663,034 A * | 5/1987 | Morelli | ............. | B01D 35/0276 210/132 |
| 4,899,785 A * | 2/1990 | Inokuchi | ............... | F16D 48/066 137/625.65 |
| 5,067,687 A * | 11/1991 | Patel | ..................... | B60T 8/3665 137/454.5 |
| 5,174,338 A * | 12/1992 | Yokota | ............... | B60G 17/0152 137/625.64 |
| 5,191,827 A * | 3/1993 | Kervagoret | ........... | B60T 8/3665 91/433 |
| 5,209,261 A * | 5/1993 | Cakmaz | ............... | B60G 17/056 137/596.17 |
| 5,228,990 A * | 7/1993 | Chiang | .................. | B01D 35/06 210/223 |
| 5,247,965 A * | 9/1993 | Oka | .................... | F15B 13/0402 137/546 |
| 5,259,414 A | 11/1993 | Suzuki | | |
| 5,284,220 A * | 2/1994 | Shimizu | .............. | F15B 13/0402 137/330 |
| 5,323,809 A * | 6/1994 | Tischer | ............... | F16K 31/0613 137/513.5 |
| 5,417,241 A * | 5/1995 | Tischer | ............... | F15B 13/0402 137/596.17 |
| 5,769,386 A | 6/1998 | Sugiura et al. | | |
| 5,785,087 A * | 7/1998 | Takahashi | ........... | F15B 13/0402 137/238 |
| 6,337,012 B1 * | 1/2002 | Devine | .................. | B01D 35/06 123/196 A |
| 6,685,280 B1 * | 2/2004 | Yoshino | ..................... | B60T 7/04 303/119.2 |
| 6,889,730 B2 * | 5/2005 | Shinoda | .................... | A23L 3/00 134/169 C |
| 7,014,772 B2 * | 3/2006 | Eleftherakis | ........... | B01D 35/06 184/6.25 |
| 2002/0162594 A1 | 11/2002 | Najmolhoda | | |
| 2005/0133429 A1* | 6/2005 | Cheong | .................. | B01D 29/01 210/232 |
| 2005/0257762 A1 | 11/2005 | Sawada | | |
| 2006/0162682 A1* | 7/2006 | Kondo | .................. | F01L 1/3442 123/90.17 |
| 2007/0131601 A1* | 6/2007 | Najmolhoda | .......... | B03C 1/286 210/222 |
| 2007/0295413 A1 | 12/2007 | Maeyama | | |
| 2008/0315140 A1 | 12/2008 | Hamaoka | | |
| 2009/0026399 A1 | 1/2009 | Ishibashi | | |
| 2014/0026988 A1* | 1/2014 | Peterson | ............. | F16H 57/0443 137/544 |
| 2014/0041742 A1 | 2/2014 | Kondo | | |
| 2014/0284282 A1* | 9/2014 | Prost | ...................... | B01D 35/06 210/695 |
| 2016/0136655 A1* | 5/2016 | Peterson | ............. | F16K 31/0644 137/544 |

FOREIGN PATENT DOCUMENTS

| | | | | |
|---|---|---|---|---|
| DE | 4417587 A1 * | 11/1995 | ............ | F15B 13/044 |
| DE | 10 2007 052 363 A1 | 5/2009 | | |
| DE | 10 2008 002 528 A1 | 12/2009 | | |
| DE | 2011055093 A1 | 5/2013 | | |
| KR | 10-2014-0065149 A | 5/2014 | | |
| WO | 2012057439 A1 | 5/2012 | | |
| WO | 2013192003 A1 | 12/2013 | | |

OTHER PUBLICATIONS

International Preliminary Report on Patentability dated Aug. 18, 2016 in corresponding Application No. PCT/EP2015/000948; 15 pgs.

Chinese Office Action and Search Report dated Jul. 3, 2018, in connection with corresponding CN Application No. 201580038363.7 (10 pgs., including partial English translation).

Translation of International Preliminary Report on Patentablility dated Jun. 7, 2018 in corresponding Application No. PCT/EP2015/000948; 7 pgs.

Chinese Office Action dated Aug. 2, 2019, in connection with corresponding CN Application No. 201580038363.7 (13 pgs., including English translation).

* cited by examiner

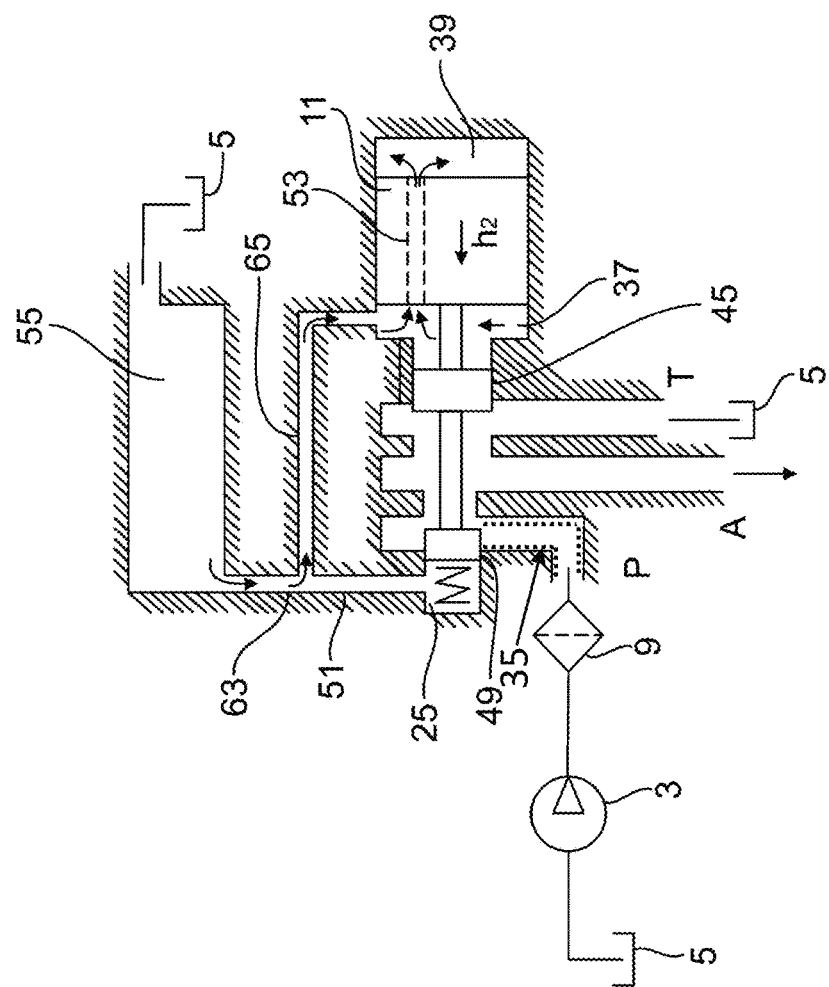

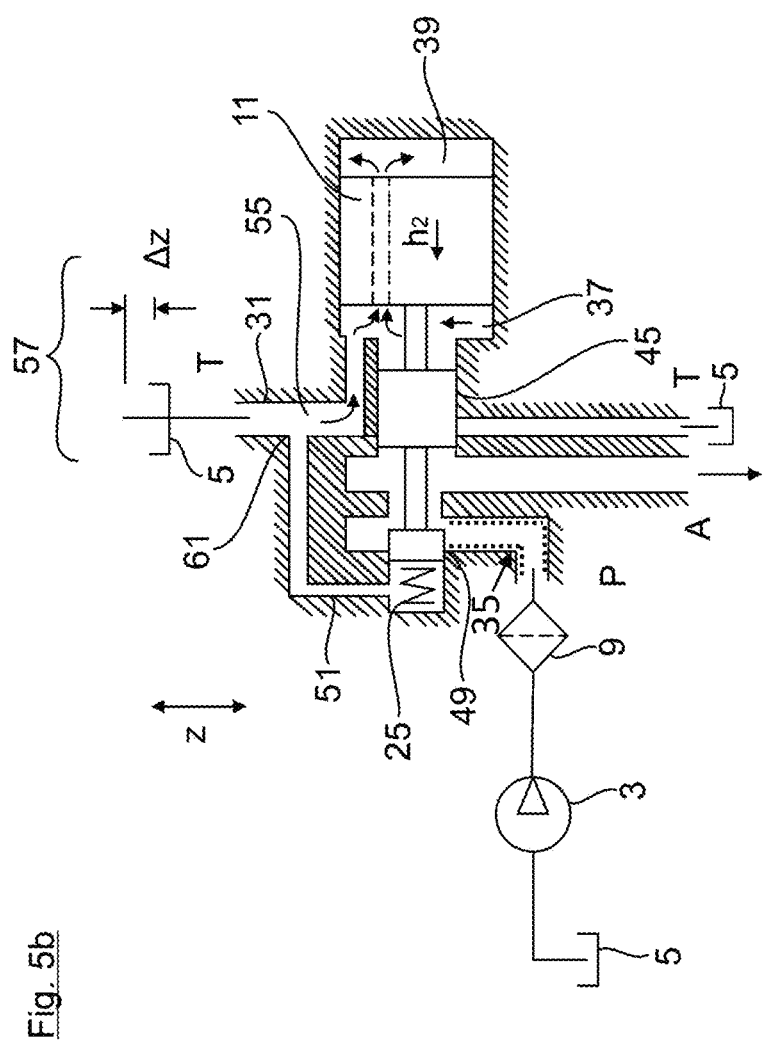

ELECTROMAGNET FOR A HYDRAULIC SYSTEM

BACKGROUND

The present invention relates to an electromagnet for a hydraulic system according to the preamble of claim 1.

An electromagnet is used, for example, for a holding device or an electromagnetic valve. This electromagnetic valve may, for example, operate as a pressure control valve, pilot valve, volume control valve, or switch valve in the hydraulic system of an automatic transmission of a motor vehicle in order to, for example, control transmission components, such as clutches or actuators to engage gears.

From DE 41 33 536 A1 a generic electromagnetic valve is known that comprises an armature chamber that is filled with hydraulic medium, that can be fluidically connected to a hydraulic line, and in which an armature is mounted such that its stroke is adjustable. The hydraulic medium contained in the armature chamber is used for cooling, lubricating, and hydraulically damping the armature. The armature interacts with an electrically controllable coil part of the electromagnetic valve, said coil part being provided outside the armature chamber. The armature comprises a shut-off body, by means of which at least one flow opening of a hydraulic line can be controlled. The shut-off body of the armature presses against a return spring so that the electromagnet works against the restoring force of the return spring during a stroke movement of the armature.

The armature furthermore divides the armature chamber into a chamber facing the flow opening (hereinafter referred to as opening-side chamber) and an inner chamber facing away from it. During a stroke movement of the armature adjustably mounted in the armature chamber of the electromagnetic valve, an oil exchange occurs between the opening-side chamber and the inner chamber, during which exchange the hydraulic medium can overflow from the opening-side chamber into the inner chamber for the purpose of volume and pressure compensation. The oil exchange (displacement suction) occurs during stroke movements of the armature, when the displacement volume in the inner chamber and in the opening-side chamber of the electromagnetic valve is different.

In a common electromagnetic valve used in motor vehicle transmissions, the oil exchange between the inner chamber and/or the opening-side chamber of the electromagnetic valve and the surroundings generally occurs using an oil pan. In doing so, the following problem exists: For example, the oil exchange occurs directly to the oil pan, which can contain metal particles in particular as a result of the abrasion of the gear set or the clutches. The hydraulic medium (hereinafter referred to as hydraulic oil) is therefore contaminated with magnetic particles, which can be attracted by the electromagnet. During an oil exchange, the particles can find their way into the armature chamber of the electromagnetic valve and cause undesirable functional impairments there, such as a disturbance of the magnetic field, a clogging of the movement corridor of the armature as well as a change of the tribological system between the armature and the inner wall delimiting the armature chamber. The particles furthermore generally remain in the armature chamber since magnetic fields prevail here due to residual magnetization or due to the electromagnet, which magnetic fields prevent flushing. In addition, dirt can be sealed off in the inner chamber via a small armature gap between the armature and the inner circumferential wall delimiting the armature chamber.

In order to increase the degree of purity of the hydraulic oil, filters are used in common hydraulic systems. The filters reduce the number of particles in the hydraulic system.

From DE 2011 055 093 A1 is known an electromagnetic valve, in which a receiving chamber is arranged fluidically upstream of the opening-side chamber of the armature chamber. In the receiving chamber is provided a floating disk, which reduces the dirt ingress of contaminating particles into the inner chamber of the armature chamber of the electromagnetic valve.

SUMMARY OF THE DISCLOSURE

The task of the invention consists in providing an electromagnet for a hydraulic system, in which the ingress of contaminating particles into the electromagnet armature chamber can be easily reduced.

The problem definition is resolved by way of the features of claim 1. Preferred further developments of the invention are disclosed in the subsidiary claims.

According to the characterizing portion of claim 1, the electromagnet comprises a hydraulic oil reservoir (hereinafter referred to as oil reservoir), in which hydraulic medium is stored, which is loaded with less contaminating particles, i.e. has a higher degree of purity, than the hydraulic medium in the hydraulic line or the hydraulic system. The oil reservoir is fluidically connected to the opening-side chamber of the armature chamber. The oil reservoir is specifically effective during an oil exchange, when hydraulic oil overflows from the opening-side chamber into the inner chamber. In this case, the oil reservoir provides at least partially the displacement volume of the hydraulic oil overflowing into the inner chamber. In this way, the dirt ingress of contaminating particles into the inner chamber is reduced, whereby the possibility of a functional impairment of the electromagnet is reduced.

The shut-off body of the armature with adjustable stroke can, for example, control the flow opening between a partial line leading to a working connection of an electromagnetic valve and a partial line leading to a tank connection of the electromagnetic valve. In this case, the oil reservoir can be formed in a constructionally easy manner directly on the partial line leading to the tank connection, namely by means of a constructionally simple cross-section expansion of the flow cross-section of the partial line. The oil reservoir can preferably be designed as a pocket-shaped recess on the inner wall of the respective hydraulic line.

As mentioned above, the tank connection of the electromagnetic valve is fluidically connected to the oil pan via a drain line. In this case, the prior art has the problem that during an oil exchange from the opening-side chamber toward the inner chamber, contaminated hydraulic oil is sucked from the oil pan and finds its way into the inner chamber via the valve-side tank connection and the opening-side chamber. In order to prevent such a return flow of contaminated hydraulic oil, the electromagnetic valve can comprise a flow interrupter. By means of the flow interrupter, a return flow from the oil pan into the opening-side chamber is prevented during the oil exchange from the opening-side chamber into the inner chamber, but an oil flow in the reverse direction is allowed.

In order to realize such a flow interrupter, the partial line leading to the pan-side tank connection can extend upward in a vertical duct in the vertical direction of the device. The tank connection (outlet opening of the partial line) provided at the end of the partial line can be arranged at a height offset geodetically above the oil pan. The tank connection can alternatively or additionally be in flow connection with the oil pan via an interposed free ventilation space.

In one technical realization of the electromagnetic valve, the shut-off body of the armature can press against a return spring or against a hydraulic return surface, i.e. the electromagnet of the electromagnetic valve works against the restoring force. The return spring can be arranged in a spring chamber, in which the shut-off body is guided adjustably. For a smooth guiding, the shut-off body can be mounted in a slide bearing in the spring chamber while forming a valve gap providing bearing clearance. The shut-off body must not necessarily be mounted in a slide bearing in the spring chamber but can instead also be mounted in a slide bearing in any hydraulic chamber.

In addition, ambient pressure can be applied to the spring chamber or the hydraulic chamber, i.e. the spring chamber or the hydraulic chamber can be connected to the oil pan via a drain line. In this case, a basic leakage of hydraulic oil takes place through the valve gap via the hydraulic chamber into the oil pan. In a design of the electromagnetic valve as a pressure control valve or a volume control valve, the shut-off body of the armature can be an axially movable piston that comprises, for example, at least a first annular collar and/or a second annular collar, which are spaced apart axially. Depending on the axial position of the piston, the control edge of the first annular collar can open or close a flow opening between a valve-side pressure connection, which leads to a pressure source, and the valve-side working connection, which leads to a hydraulic consumer, i.e. a transmission component, for example. In the same way, the control edge of the second annular collar of the armature can open or close a flow opening between the valve-side tank connection and the valve-side working connection. The pressure source can be a hydraulic pump, the suction side of which is fluidically connected to the oil pan.

The aforementioned valve gap between the hydraulic chamber and the shut-off body movably guided therein is extremely small in the technical implementation. The valve gap therefore acts as a retaining means that traps contaminating particles in the hydraulic oil draining off. The hydraulic oil flowing into the hydraulic chamber therefore has a higher degree of purity than the hydraulic oil in the hydraulic line.

In a preferred embodiment, the gap-filtered hydraulic oil contained in the hydraulic chamber is not returned unused into the oil pan but held available for the oil exchange, in which an oil displacement volume overflows into the inner chamber. For this purpose, the oil reservoir is formed by expanding the cross-section of the hydraulic chamber or the drain line. The hydraulic chamber/drain line can be connected directly to the opening-side chamber via a connecting line. In the case of the oil exchange, the gap-filtered hydraulic oil can thus be conducted from the hydraulic chamber via the connecting line and the opening-side chamber into the inner chamber.

In another embodiment, the opening-side chamber of the armature chamber can be separated from the hydraulic line by means of a valve housing wall. The valve housing wall can comprise a bearing opening, through which the shut-off body of the armature is guided, namely while forming a valve gap providing a bearing clearance. With respect to a pressure compensation between the hydraulic line and the opening-side chamber, a compensation line can be provided, via which the displacement volume of the hydraulic oil is can be conducted at least partially during the oil exchange.

According to another embodiment, a hydraulic line leading to the opening-side chamber or the inner chamber of the armature chamber can comprise at least one dirt collecting element, preferably designed as a permanent magnet, that retains contaminations in the hydraulic medium that flows through the hydraulic line during an oil exchange.

Alternatively and/or additionally, in the connecting line leading to the opening-side chamber of the armature chamber is provided at least one dirt collecting element that retains contaminating particles in the hydraulic oil that flows through the connecting line during an oil exchange.

For example, the dirt collecting element can be a rod-like permanent magnet that is made from a solid material and preferably positioned in the collecting line. Alternatively, the dirt collecting element can be made not from a solid material but rather from a flow-permeable mesh that is positioned in the compensation line and is in particular made from a magnetic material. The dirt collecting element can also be designed as a dirt collecting contour that is formed on the inner wall of the connecting line and that comprises elevations and depressions. The bottom of the depressions can additionally be magnetic in order to increase the retention effect of the dirt collecting contour.

The previously proposed (and/or provided again in the dependent claims) advantageous executions and/or improvements of the invention can—except for situations of unambiguous dependencies or incompatible alternatives be implemented alone or in any combination with one another.

The invention and its advantageous embodiments and/or further developments as well as their advantages are explained in more detail below with reference to the drawings.

BRIEF DESCRIPTION OF THE DRAWINGS

Shown are:

FIGS. 2 to 5 respectively views corresponding to FIG. 1b, which respectively show different exemplary embodiments of the electromagnetic valve according to the invention;

DETAILED DESCRIPTION OF THE DRAWINGS

Figure 1A:
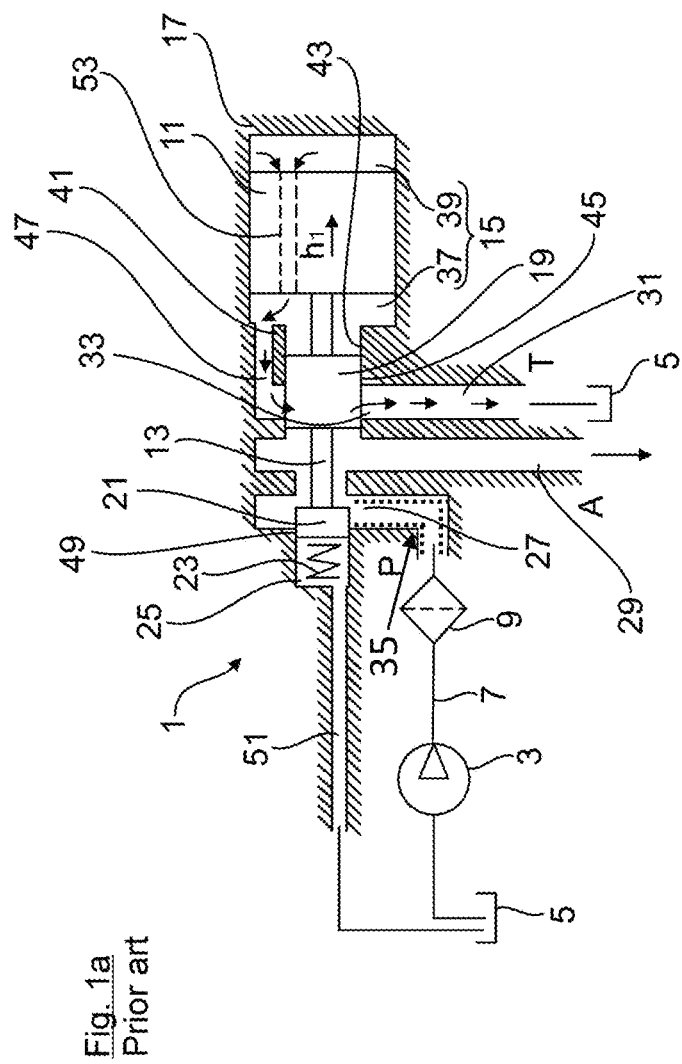
FIGS. 1a, 1b, and 1c an electromagnetic valve not included in the invention in different operating states in a rough schematic illustration.
Figure 1B:
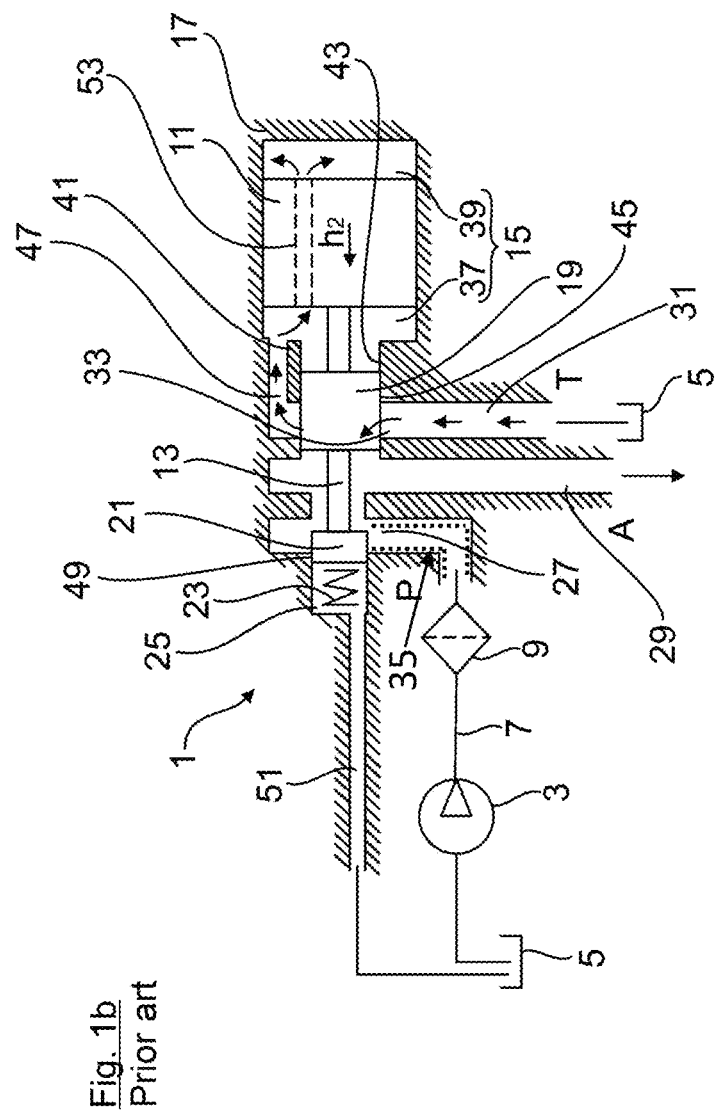

FIGS. 1a and 1b first show a comparative example not included in the invention for easier comprehension of the invention, in which example an electromagnetic valve 1 is arranged in a partially shown hydraulic system of an automatic transmission. The hydraulic system comprises a hydraulic pump 3 that is connected on the suction side to an oil pan 5 and on the pressure side via a pressure line 7 to a pressure connection P of the electromagnetic valve 1. The electromagnetic valve 1 additionally comprises a working connection A, which is connected to a hydraulic component of the transmission, such as a clutch or an actuator to engage gears, via a working line not shown. The electromagnetic valve 1 also comprises a tank connection T, which is also fluidically connected to the oil pan 5. In order to remove contaminating particles from the hydraulic oil, a filter 9 is arranged in the pressure line 7.

In FIGS. 1a and 1b, the electromagnetic valve is, for example, a directly controlled pressure control valve with an armature 11 that has an axially adjustable stroke and is extended by shut-off body 13. The armature 11 is guided stroke-adjustably in an armature chamber 15 that is filled with hydraulic oil and fluidically connected to the hydraulic path in the electromagnetic valve 1. The armature chamber 15 is delimited by a valve housing 17 indicated shaded, wherein outside the armature chamber 15 is arranged an electromagnet coil (not shown), which can be controlled by a transmission control device in order to adjust the armature 11 using electromagnetic force.

In FIGS. 1a and 1b, the shut-off body 13 of the armature 11 comprises a first annular collar 19 and a second annular collar 21 with a smaller diameter, which are spaced apart axially and formed on the shut-off body 13. The front face of the shut-off body 13 facing away from the armature 11 is supported by a return spring 23 that is positioned in a spring chamber 25.

Depending on the axial position of the shut-off body 13, a control edge of the first annular collar 19 more or less covers a flow opening 33 between a partial line 29 leading to the working connection A and a partial line 31 leading to the tank connection T.

Accordingly, depending on the axial position of the piston, the control edge of the second annular collar more or less covers the flow opening 27 between the partial line 35 leading to the pressure connection P and the partial line 29 leading to the working connection A.

As can also be seen in FIGS. 1a and 1b, the armature chamber 15 is divided by means of the stroke-adjustable armature 11 into a chamber 37 facing the flow openings 27, 33 and an inner chamber 39 facing away from them. The flow-side chamber 37 is separated from the partial line 31 leading to the tank connection T by means of a separating wall 41 on the valve housing side. The separating wall 41 comprises a bearing opening 43, in which the annular collar 19 of the shut-off body 13 is mounted while forming a valve gap 45 providing a bearing clearance. In addition, the separating wall 41 comprises a connecting line 47, via which the opening-side chamber 37 and the partial line 31 leading to the tank connection T are connected to one another.

The second annular collar 21 with the smaller diameter is adjustably mounted in the spring chamber 25 while forming another valve gap 49 providing a bearing clearance. Moreover, a drain line 51 leads from the spring chamber 25 to the oil pan 5, via which ambient pressure is applied to the spring chamber 25.

During a stroke displacement $h_1$, $h_2$ of the armature 11 as a result of a corresponding controlling of the coil part of the electromagnetic valve, an oil exchange takes place between the flow-side chamber 37 and the inner chamber 39. Exemplarily, the armature 11 in FIG. 1a is moved into the armature chamber 15 by means of a stroke displacement $h_1$. As a result, a displacement volume of the hydraulic oil is conducted from the inner chamber 39 via a compensation line 53 (shown dashed) in the armature 11 to the flow-side chamber 37. Said flow-side chamber however has a smaller volume than the inner chamber 39 so that the displacement volume is at least partially conducted via the connecting line 47 and via the partial line 31 to the oil pan 5 as indicated by arrows in FIG. 1a.

On the other hand, in FIG. 1b, the armature 11 is moved out of the armature chamber 15 by means of a stroke displacement $h_2$. During such an oil exchange, the problem exists in FIG. 1b that contaminated hydraulic oil is sucked from the oil pan 5 through the tank connection T, the partial line 31, and the connecting line 47 into the flow-side chamber 37 and from there further through the compensation line 53 into the inner chamber 39, whereby contaminating particles can accumulate in the inner chamber 39.

Figure 1C:
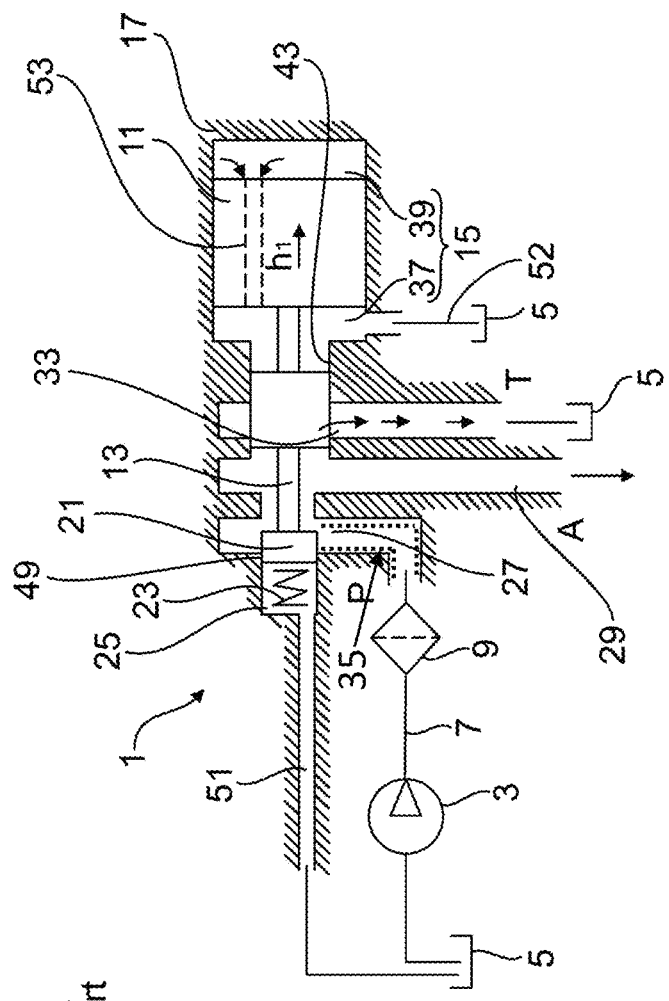

The problem described above also applies to the valve shown in FIG. 1c, which valve is basically constructed in the same manner as the valve shown in FIGS. 1a and 1b. In contrast to FIGS. 1a and 1b, the opening-side chamber 37 in FIG. 1c is connected directly to the oil pain 5 via a drain line 52 so that during the stroke displacement $h_2$, the contaminated hydraulic oil directly finds its way from the oil pan 5 through the drain line 52 into the opening-side chamber 37.

Figure 2:
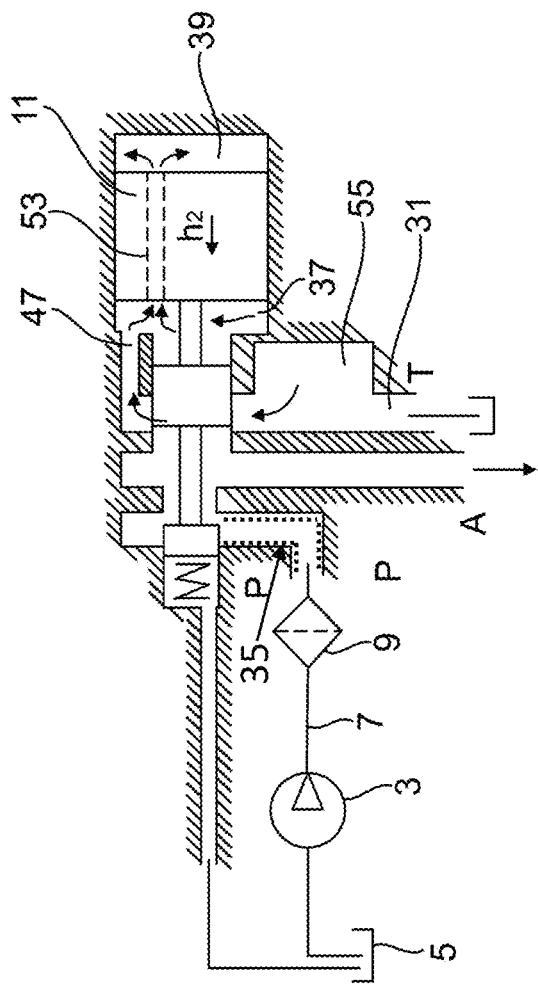

In order to avoid such a displacement suction of contaminated hydraulic oil into the inner chamber 39, the electromagnetic valve 1 in FIG. 2 comprises an oil reservoir 55, in which is stored hydraulic oil that has a higher degree of purity than the hydraulic oil in the hydraulic lines 29, 31, 35, i.e. it is less interspersed with contaminating particles. The oil reservoir 55 in FIG. 2 is designed in the manner of a pocket-shaped recess in the inner wall of the partial line 31 leading to the tank connection T. In this case, the oil reservoir 55 forms a dead zone, in which the hydraulic oil only moves at a limited flow velocity, whereby contaminating particles can sediment. In this way, the degree of purity of the hydraulic oil contained therein increases. The degree of purity of the hydraulic oil stored in the oil reservoir 55 is further increased by the following factor: During hydraulic operation, the oil reservoir 55 is not filled with contaminated hydraulic oil from the oil pan 5 but rather is filled when the hydraulic oil, which is pre-filtered by means of the filter 9, is conducted via the line 31 leading to the tank connection T into the oil pan 5 in order to reduce pressure.

During an oil change (due to the stroke displacement $h_2$) indicated in FIG. 2 by arrows, the hydraulic oil that was purified by sedimentation and filtering (by means of filter 9), and not the highly contaminated hydraulic oil from the oil pan 5, is thus for the most part provided as displacement volume that is displaced into the inner chamber 39 during the oil exchange.

Figure 3:
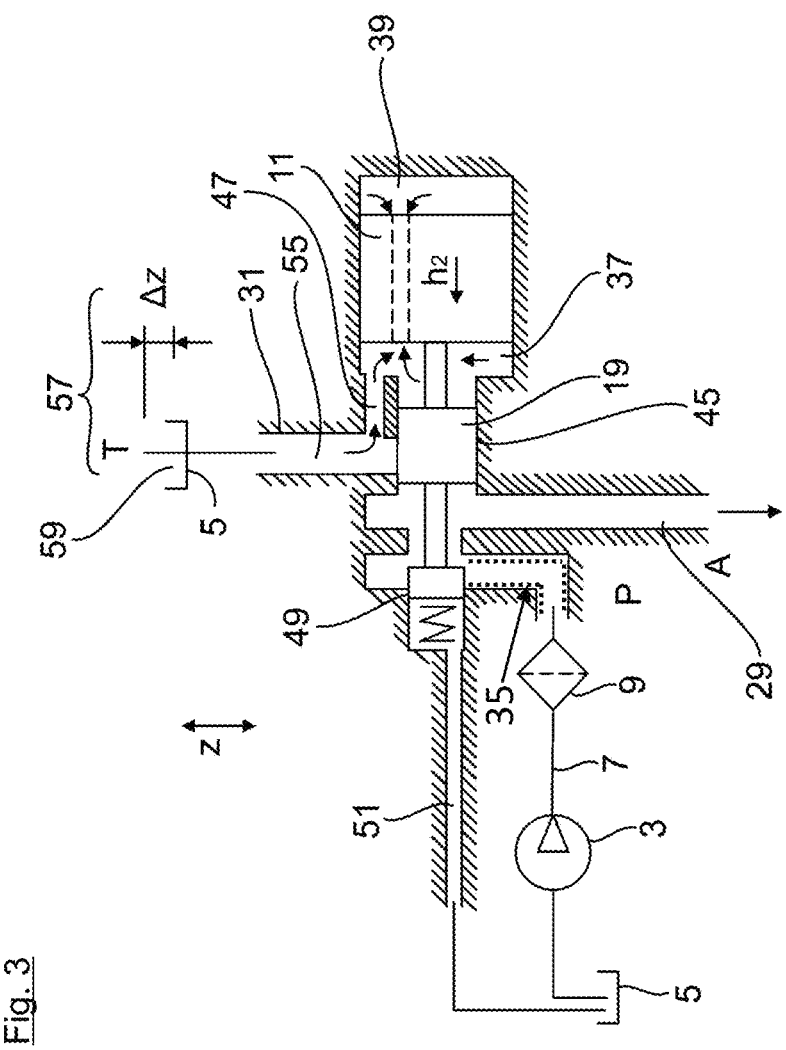

In FIG. 3, the electromagnetic valve 1 additionally comprises a flow interrupter 57, which interrupts a flow connection to the oil pan 5 during the oil exchange from the opening-side chamber 37 into the inner chamber 39 (see arrows in FIG. 3), whereby a return flow of contaminated hydraulic oil into the opening-side chamber 37 and further into the inner chamber 39 is prevented. In order to form the flow interrupter 57, the partial line 31 leading to the pan-side tank connection T is guided upward in FIG. 3 in a vertical duct in the vertical direction z of the device. The tank connection T in FIG. 3 is realized by means of an upwardly open, free outlet opening that is arranged at a height offset $\Delta z$ geodetically above the oil pan 5. Between the tank connection T (i.e. the free outlet opening) and the oil pan 5, a free ventilation space 59 is also arranged, which prevents the aforementioned return flow. The partial line 31 leading to the tank connection T is formed in FIG. 3 by the oil reservoir 55.

FIG. 3 shows a valve position, in which the annular collar 19 of the shut-off body 13 closes the chimney-like oil reservoir 55. In this operating state, a gap filtration occurs, in which the hydraulic oil is supplied through the valve gap at the annular collar 19 of the shut-off body 13 to the opening-side chamber 37 and thus fills the chimney-like oil reservoir 55.

The oil reservoir 55 is also filled when the annular collar 19 of the shut-off body 13 opens a flow gap to the oil reservoir 55. In this case, the oil already filtered by the filter 9 is supplied to the oil reservoir 55.

Figure 5A:
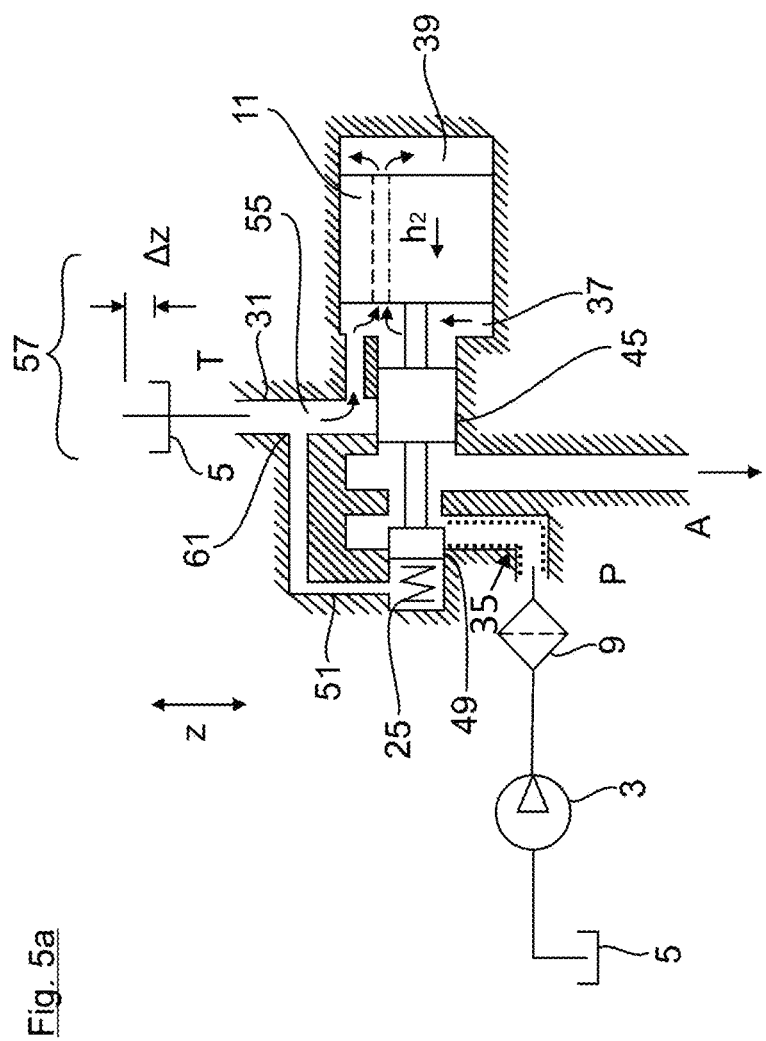
Figure 6:
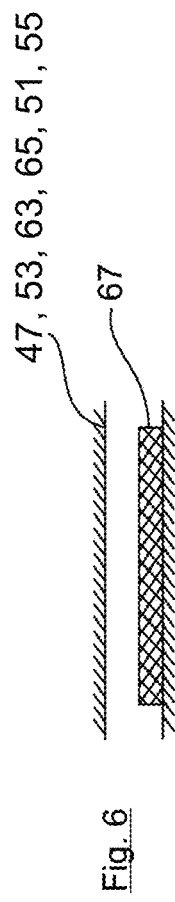
FIG. 6 a connecting line leading to the opening-side chamber of the armature chamber, with a dirt collecting element in a detailed view.

FIG. 5a shows another design variant, the basic design of which is identical to that of FIG. 3. In FIG. 5a, the hydraulic oil that flows through the valve gap 45 into the spring chamber 25 as part of the basic leakage, i.e. the hydraulic oil that is already gap-filtered, is provided for the oil exchange mentioned above. For this purpose, the drain line 51 does not lead to the oil pan 5 directly but rather via the interposed partial line 31 leading to the tank connection T, because the drain line 51 leads to a branch point 61 in the preferably chimney-like partial line 31 being used as oil reservoir 55.

The valve shown in FIG. 5b is substantially constructed in the same manner as the valve shown in FIG. 5a. In contrast to FIG. 5a, a second tank connection T is provided in FIG. 5b. In FIG. 5b, the oil reservoir 55 is filled by means of a gap leakage, in which gap-filtered leakage oil is supplied from the spring chamber 25 to the oil reservoir 55. The oil reservoir 55 in FIG. 5b is thus exclusively filled with gap-filtered oil, whereby the degree of purity of the oil stored in the oil reservoir 55 is further increased.

In FIG. 4, the gap-filtered hydraulic oil flowing into the spring chamber 25 is also used as displacement volume for the oil exchange. Consequently, the drain line 51 branching off from the spring chamber 25 is connected to the oil pan 5 via the interposed oil reservoir 55. In addition, a connecting line 65 that leads directly to the flow-side chamber 37 is branched off at a branch point 63 between the spring chamber 25 and the oil reservoir 55. The displacement volume required during the oil exchange is thus completely provided by means of the gap-filtered hydraulic oil. The arrangement of the lines shown in FIG. 4 may be dispensed with the connecting line 47, shown in the previous FIGS. 1 to 3 and 5, that connects the partial line 31 to the flow-side chamber 37.

Figure 7:
FIGS. 7 to 10 respectively views corresponding to FIG. 6 with alternative dirt collecting elements.

The following FIGS. 6 to 10 show different exemplary embodiments of the connecting lines 47, 65. According to FIG. 6, a rod-like permanent magnet 67 is arranged in the connecting line 47, 65. The permanent magnet acts as a dirt collecting element, with which ferromagnetic contaminating particles can be removed from the hydraulic oil flowing past. Alternatively, the dirt collecting element in FIG. 7 is not a rod-like permanent magnet but rather a flow-permeable mesh, through which the hydraulic oil can flow. The mesh can preferably be made from a magnetic material.

Figure 8:
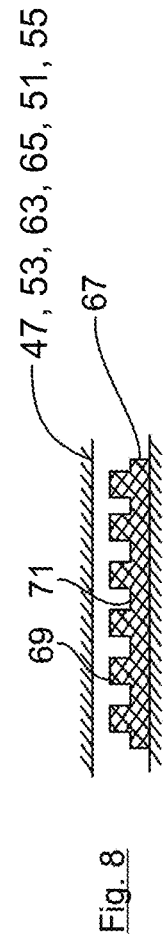
Figure 9:

In FIG. 8, the dirt collecting element is a dirt collecting contour with elevations 69 and depressions 71. In FIG. 8, the dirt collecting contour 67 is made from a magnetic material. In FIG. 9, the dirt collecting element is also designed as a dirt collecting contour with elevations 69 and depressions 71. In contrast to FIG. 8, however, only the bottoms 73 of the depressions 71 are magnetic in FIG. 9.

Figure 10:
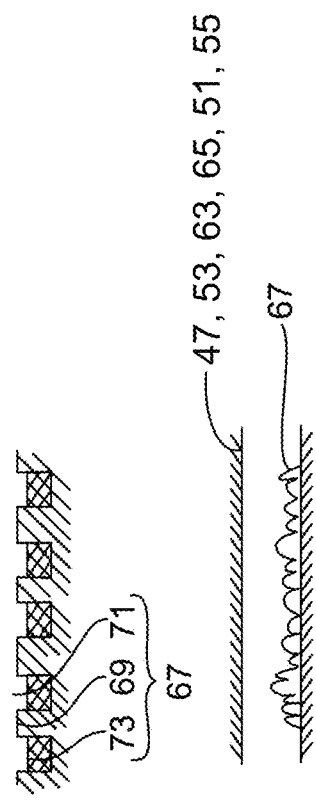

FIG. 10 shows an exemplary embodiment, in which the dirt collecting element is a web that is placed on the bottom side in the connecting line in the manner of a doormat. During hydraulic operation, dirt particles from the oil sediment in the web and are trapped there.

The invention claimed is:

1. An electromagnetic valve for a hydraulic system, comprising:
    an armature chamber, the armature chamber configured to be filled with a hydraulic medium, and a hydraulic chamber configured to be fluidically connected to a plurality of hydraulic lines of the hydraulic system, wherein the hydraulic lines are adapted to transport hydraulic medium;
    the armature chamber further comprising an armature, the armature mounted in the armature chamber such that the stroke of the armature is adjustable, the armature further comprising a shut-off body;
    the armature chamber further comprising an opening-side chamber and an inner chamber, wherein the armature is moved between the opening-side chamber and the inner chamber so that the armature moving toward the opening-side chamber shrinks the opening-side chamber and expands the inner chamber and the armature moving away from the opening-side chamber expands the opening-side chamber and shrinks the inner chamber, the opening side chamber faces the plurality of hydraulic lines which are fluidically connected to the hydraulic chamber, and the inner chamber faces away from the plurality of hydraulic lines;
    wherein a compensation hydraulic line is disposed in the armature and connects the opening-side chamber and the inner chamber;
    wherein the armature is positioned such that a stroke movement of the armature induces an oil exchange, wherein a displacement volume of the hydraulic medium overflows from the opening-side chamber into the inner chamber;
    the electromagnetic valve further comprising a hydraulic medium reservoir configured to be filled with purified hydraulic medium transported by at least one of the plurality of hydraulic lines, wherein the hydraulic medium reservoir is fluidically connected to the opening-side chamber;
    wherein the purified hydraulic medium comprises gap-filtered hydraulic medium, and wherein the hydraulic medium reservoir is at least partially filled with the gap-filtered hydraulic medium;
    wherein the shut-off body is disposed in a spring chamber and the hydraulic chamber such that the shut-off body is adjustably guided in its movement by an internal geometry of the spring chamber and the hydraulic chamber, such that a valve gap providing a bearing clearance is formed between the hydraulic chamber and the shut-off body;
    wherein the spring chamber is connected, via at least one of the plurality of hydraulic lines, to the hydraulic medium reservoir, the hydraulic chamber configured to leak gap-filtered hydraulic medium into the spring chamber via the valve gap and through the at least one hydraulic line;
    wherein the plurality of hydraulic lines comprises a drain line and a connecting hydraulic line, the drain line connecting the spring chamber to the connecting hydraulic line;
    wherein the connecting hydraulic line is directly connected to the opening-side chamber from the drain line; and
    wherein the connecting hydraulic line is configured to receive the displacement volume of the hydraulic medium and conduct the displacement volume via the connecting hydraulic line during the oil exchange.

2. The electromagnetic valve according to claim 1, wherein the shut-off body of the armature comprises an axially movable piston having at least one of a first annular collar and a second annular collar;
    wherein a first control edge of the first annular collar is configured to open and close a flow opening between the working connection of the electromagnetic valve and the pan-side tank connection; and
    wherein a second control edge of the second annular collar is configured to open and close a flow opening between a pressure connection of a pressure source and the working connection of the electromagnetic valve.

3. The electromagnetic valve according to claim 1, wherein a dirt-collecting hydraulic line comprises at least one hydraulic line in the set of: the plurality of hydraulic lines, the connecting hydraulic line, a branch of the connecting hydraulic line, the compensation hydraulic line disposed in the armature, and the drain line; and wherein the dirt-collecting hydraulic line further comprises a dirt-collecting element, the dirt-collecting element comprising a permanent magnet, the dirt-collecting element configured to retain contaminations in the hydraulic medium that flows through the dirt-collecting hydraulic line during the oil exchange.

4. The electromagnetic valve according to claim 3, wherein the dirt-collecting element is a rod-shaped permanent magnet.

5. The electromagnetic valve according to claim 3, wherein the dirt-collecting element is a flow-permeable mesh formed from magnetic material.

6. The electromagnetic valve according to claim 3, wherein the dirt collecting element comprises a dirt collecting contour that is formed on the inner wall of the dirt-collecting hydraulic line, the dirt collecting contour comprising a plurality of elevations and a plurality of depressions, wherein only the bottoms of each of the plurality of depressions are magnetic.

\* \* \* \* \*